(12) United States Patent
Maskrot et al.

(10) Patent No.: US 12,558,723 B2
(45) Date of Patent: Feb. 24, 2026

(54) PART HAVING A POROUS STRUCTURE AND RELATED MANUFACTURING METHOD

(71) Applicant: COMMISSARIAT A L'ENERGIE ATOMIQUE ET AUX ENERGIES ALTERNATIVES, Paris (FR)

(72) Inventors: Hicham Maskrot, Montlhery (FR); Olivier Hercher, Fontenay les Briis (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 18/061,577

(22) Filed: Dec. 5, 2022

(65) Prior Publication Data

US 2023/0182204 A1     Jun. 15, 2023

(30) Foreign Application Priority Data

Dec. 8, 2021     (FR) ...................................... 21 13176

(51) Int. Cl.
| | |
|---|---|
| *B22F 3/11* | (2006.01) |
| *B22F 10/28* | (2021.01) |
| *B33Y 10/00* | (2015.01) |
| *B33Y 80/00* | (2015.01) |

(52) U.S. Cl.
CPC ............ *B22F 3/1103* (2013.01); *B22F 10/28* (2021.01); *B33Y 10/00* (2014.12); *B33Y 80/00* (2014.12); *B22F 2304/10* (2013.01)

(58) Field of Classification Search
None
See application file for complete search history.

(56) References Cited

U.S. PATENT DOCUMENTS

| | | | |
|---|---|---|---|
| 9,597,837 B1 * | 3/2017 | Cesarano, III | ........ B29C 64/112 |
| 2003/0006534 A1 * | 1/2003 | Taboas | .................. B29C 39/021 |
| | | | 264/401 |
| 2006/0147332 A1 | 7/2006 | Jones et al. | |
| 2007/0142914 A1 | 6/2007 | Jones et al. | |
| 2007/0203584 A1 * | 8/2007 | Bandyopadhyay | .......................... |
| | | | B23K 26/0006 |
| | | | 623/901 |
| 2010/0010638 A1 | 1/2010 | Jones et al. | |

(Continued)

FOREIGN PATENT DOCUMENTS

| | | |
|---|---|---|
| EP | 1 683 593 A2 | 7/2006 |
| EP | 1 800 700 A2 | 6/2007 |

(Continued)

OTHER PUBLICATIONS

French Preliminary Search Report Issued Jul. 6, 2022 in French Application 21 13176 filed on Dec. 8, 2021 (with English Translation of Categories of Cited Documents), 4 pages.

*Primary Examiner* — Seth Dumbris
(74) *Attorney, Agent, or Firm* — Oblon, McClelland, Maier & Neustadt, L.L.P.

(57) ABSTRACT

A part including a porous structure including cellular pores and formed at least in part by the periodic repetition of a basic pattern, each cellular pore being delimited by a wall, made of a metal or a polymer, having a parietal porosity greater than 5% and including parietal pores with a mean size less than the mean size of the cellular pores.

16 Claims, 2 Drawing Sheets

(56)          References Cited

U.S. PATENT DOCUMENTS

| | | | |
|---|---|---|---|
| 2010/0291176 A1* | 11/2010 | Chian | B33Y 70/00 |
| | | | 424/423 |
| 2011/0014081 A1 | 1/2011 | Jones et al. | |
| 2011/0064784 A1* | 3/2011 | Mullens | A61P 19/08 |
| | | | 424/443 |
| 2012/0215310 A1 | 8/2012 | Sharp et al. | |
| 2012/0232654 A1 | 9/2012 | Sharp et al. | |
| 2014/0249643 A1 | 9/2014 | Jones et al. | |
| 2016/0167132 A1* | 6/2016 | Panat | H01G 11/24 |
| | | | 419/53 |
| 2017/0014235 A1 | 1/2017 | Jones et al. | |
| 2017/0056178 A1 | 3/2017 | Sharp et al. | |
| 2017/0182561 A1* | 6/2017 | Scancarello | B22F 10/28 |
| 2017/0252165 A1 | 9/2017 | Sharp et al. | |
| 2018/0055641 A1 | 3/2018 | Jones et al. | |
| 2019/0118264 A1* | 4/2019 | Qi | B22F 10/38 |
| 2020/0298466 A1* | 9/2020 | Liang | B29C 64/106 |
| 2020/0306048 A1 | 10/2020 | Jones et al. | |
| 2021/0186701 A1 | 6/2021 | Sharp et al. | |

FOREIGN PATENT DOCUMENTS

| | | | | |
|---|---|---|---|---|
| FR | 3033518 A1 * | 9/2016 | | B32B 1/00 |
| WO | WO 2011/022550 A1 | 2/2011 | | |
| WO | WO 2020/208938 A1 | 10/2020 | | |

* cited by examiner

[Figure 1]
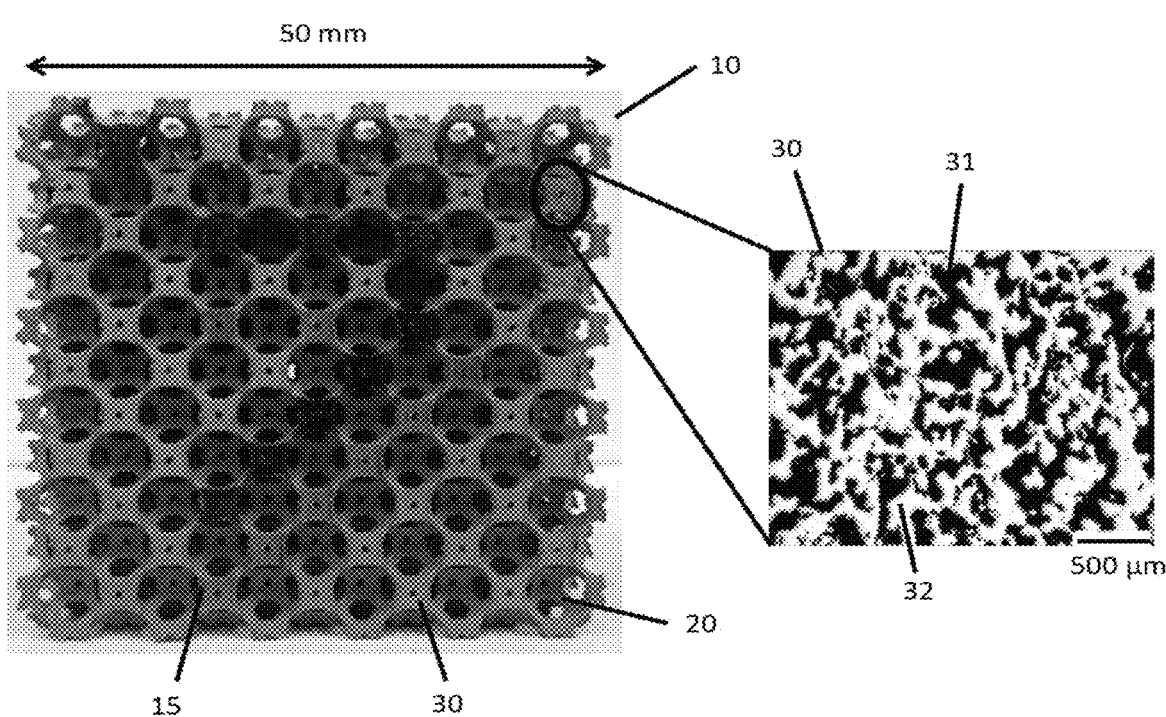
[Figure 2]
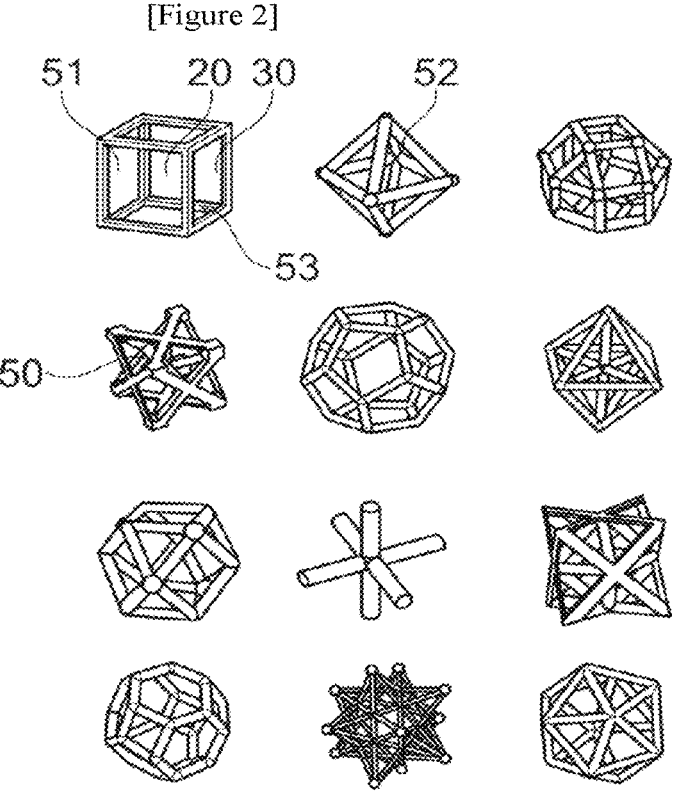

[Figure 3]
A
100
HD
110
e
120
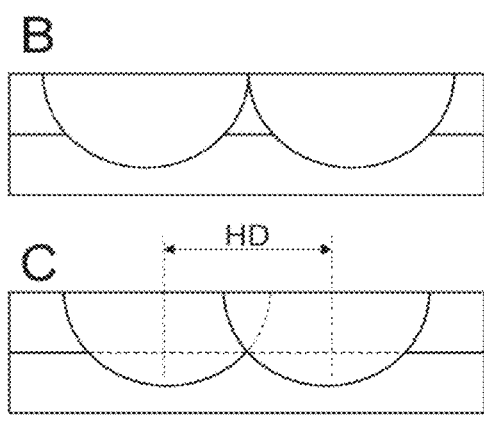
B
C
HD

PART HAVING A POROUS STRUCTURE AND RELATED MANUFACTURING METHOD

CROSS-REFERENCE TO RELATED APPLICATIONS

The present application claims the benefit of the filing date of French Appl. No. 21 13176, filed on Dec. 8, 2021.

TECHNICAL DOMAIN

The present invention pertains to the domain of porous structures comprising cellular pores, notably intended to form some or all of a shock absorbing device.

PRIOR ART

In order to absorb the energy of a shock, a shock absorbing device can have a metal or polymeric cellular structure. Such a cellular structure has high porosity, making the structure lightweight with good mechanical performance, notably enabling the structure to dissipate energy by means of sufficient plastic deformation in compression to absorb the energy of a shock.

A shock absorbing device can be manufactured by founding, notably by moulding. However, founding is energy intensive and makes it difficult or impossible to obtain cellular pore smaller than 14 mm. It is also known to manufacture such a device by additive manufacturing, which simplifies the manufacture of specific complex shapes, as well as small cellular pores.

FR 3033518 A1 describes for example a metal or alloy part comprising cells that can be made by founding or additive manufacturing.

There is a need, notably in the automobile industry, to reduce the weight of such shock absorbing devices, in particular as part of ongoing efforts to reduce the energy consumption of vehicles.

DESCRIPTION OF THE INVENTION

The invention relates to a part comprising a porous structure comprising cellular pores and formed at least in part by the periodic repetition of a basic pattern, each cellular pore being delimited by a wall, made of a metal or a polymer, having a parietal porosity greater than 5% and comprising parietal pores with a mean size less than the mean size of the cellular pores.

The part according to the invention is advantageously more lightweight than a part having an identical cellular pore structure in which each of the cellular pores is still limited by a dense wall.

The "parietal porosity" is the ratio of the volume occupied by the parietal pores to the volume occupied by the walls of the porous structure. The volume occupied by the walls of the porous structure is equal to the sum of the volume of the material forming the parietal pores and of the volume occupied by the parietal pores. The "parietal pores" are the pores contained in the walls.

The "cell porosity" is the ratio of the volume occupied by the cellular pores to the volume occupied by the porous structure. The volume occupied by the porous structure is equal to the sum of the volume occupied by the walls and of the volume occupied by the cellular pores.

The total porosity of the porous structure is the sum of the cell porosity and the parietal porosity.

An "open" pore is delimited by a hollow wall. An open pore is therefore in fluid communication with another adjacent open pore.

The "mean" size of a pore population is the mean value of the size of the pore populations.

The "size" of a cellular pore or of a parietal pore can be determined using the following method: The part can first be soaked in resin. A slice of the part being analysed is cut out then polished to obtain a good surface condition, said polishing being executed with fine-grain polishing paper, at least grade 1200, preferably with a diamond slurry. Snapshots of the polished slice are taken using an optical microscope or an electronic microscope. The enlargement used is such that the width of the image is between five and ten times the mean size of the pores. A first snapshot can be taken using a visual estimate of the mean size of the pores. The size of the pores is determined by analysing the snapshots using a thresholding method followed by the erosion/dilation executed for example by image analysis software such as ZEN CORE 2© sold by the company Zeiss©. The "size" of a pore in the image is the diameter of the smallest circle circumscribing said pore.

The mean size of the parietal pores can be determined in an image representing a cross section of one or more walls. The mean size of the cellular pores can be determined in an image representing a cross section of the cellular structure. Naturally, to measure the mean size of the cellular pores, an image is captured at a lower magnification than for measuring the mean size of the parietal pores.

The described method also enables the cell porosity and/or the parietal porosity to be determined by addition. The cell porosity in the image is the ratio of the sum of the areas occupied by the cellular pores to the area of the section of the porous structure shown in the image. The "parietal porosity" in the image is the ratio of the sum of the areas occupied by the parietal pores to the total area occupied by the walls.

The parietal porosity can be between 5% and 80%, in particular between 20% and 60%.

The mean size of the parietal pores can be less than 500 $\mu$m, in which preferably at least 85% of the parietal pores are smaller than 200 $\mu$m, and in which preferably more than 50% of the parietal pores are smaller than 50 $\mu$m.

The parietal pores can be distributed irregularly, and notably randomly, in the walls. The parietal pores can be distributed uniformly in the walls. For example, the parietal porosity does not vary by more than 20% or 10% or 5% between two different zones of volume equal to three times the cube of the thickness of one of the walls.

The parietal pores can be irregularly shaped, notably not spherical.

The walls may be solid, i.e. with no parietal pores traversing the thickness thereof.

In a variant, the walls are hollow. A hollow wall has at least one cavity traversing the entire thickness thereof.

The walls may be in the form of a lattice. The walls may notably be a polyhedral assembly of bars delimiting one of the cavities.

The porous structure may comprise solid walls and hollow walls.

Portions of at least one of the walls may delimit several adjacent cellular pores. The walls may have several flat or curved faces.

The walls can separate at least two adjacent cellular pores, notably more than two adjacent cellular pores.

The thickness of at least one of the walls, or of each wall, can be at least 200 $\mu$m, preferably at least 800 $\mu$m, or at least 1 mm. The thickness of a wall is the shortest distance between two of the opposing faces of the wall.

The porous structure can have open cellular pores. More than 90%, and preferably more than 95%, of the number of cellular pores can be open, or all of the cellular pores can be open.

The mean size of the cellular pores can be greater than 100 μm, preferably greater than 500 μm, or greater than 1 mm. Said mean size can be less than 14 mm, or less than 10 mm.

The mean size of the cellular pores can be at least 20 times greater, preferably at least 50 times greater, or at least 100 times greater than the mean size of the parietal pores.

The cell porosity can be greater than 70%, preferably greater than 80%, or greater than 90%, or better greater than 95%. The cell porosity may be less than 97%, for example 96%.

The porous structure is formed at least in part, or even in full, by the periodic repetition of a basic pattern.

The basic pattern can be repeated periodically along an axis, or two axes, or preferably three axes different from one another, and preferably orthogonal to one another. The basic pattern can be repeated more than five times, more than ten times, or more than fifty times along each axis, notably as a function of the intended application of the part.

The basic pattern can comprise or include one cellular pore and, at least in part, the wall delimiting said cellular pore. The basic pattern can comprise one or more cellular pores. In a variant, a cellular pore can be defined by repeating the basic pattern at least ten times.

The basic pattern can be convex, concave or star-shaped. In particular, the basic pattern can be a lattice, notably a convex lattice or a star-shaped lattice. The basic pattern can be any other shape achievable by additive manufacturing that forms cellular pores by repetition.

Preferably, the porous structure is made of a metal.

The porous structure can comprise one of the following metals: aluminium, nickel, cobalt, iron, copper, palladium, titanium, tungsten, silver, platinum and alloys thereof, notably comprising more than 95% of the mass thereof, notably more than 99.0% of the mass thereof, or notably more than 99.9% of the mass thereof. In particular, the porous structure can be made of stainless steel or a shape-memory alloy, notably an alloy of nickel and titanium, for example Nitinol. Preferably, the porous structure is made of stainless steel.

In a variant, the porous structure can comprise one of the following polymers: polyamides, polystyrenes, thermoplastic elastomers, polyaryletherketones and mixtures thereof, preferably polyamides, in particular a nylon such as nylon PA12, nylon PA11 or nylon PEBA, notably comprising more than 80% of the mass thereof, or more than 90% of the mass thereof. The porous structure can include glass fibres, glass beads, aluminium powder and mixtures thereof.

The invention also relates to a shock absorbing device formed at least in part by a part according to the invention, for example for protecting objects, notably in the event of a fall or during transportation.

The invention also relates to a device comprising a part according to the invention, said device being a vehicle, notably a motor car or railway vehicle, a porous tank, a shim or an acoustic damper.

The invention also relates to a method for manufacturing a part according to the invention, in which the method involves producing the porous structure by shaping a powder using an additive manufacturing technique.

Preferably, the additive manufacturing technique is a powder-bed additive manufacturing technique.

Preferably, the additive manufacturing technique involves the partial or complete fusion of powder particles using a light beam or an electron beam, in particular a light beam. Preferably, the light beam is a laser beam.

Numerous powder-bed additive manufacturing techniques known to the person skilled in the art can be used. In particular, the additive manufacturing technique can be one of the following:

binder jetting, which involves printing by depositing binder onto a powder bed, laser powder bed fusion (LPBF) or selective laser melting (SLM), selective laser sintering (SLS), electron beam melting (EBM), and multi jet fusion (MJF), which involves depositing binder onto a powder bed.

Preferably, the additive manufacturing technique is laser powder bed fusion (LPBF) or selective laser sintering (SLS), and more preferably laser powder bed fusion (LPBF). Laser powder bed fusion (LPBF) is preferably used to form a metal porous structure. The selective laser sintering (SLS) is preferably used to form a polymer porous structure.

The additive manufacturing technique by laser powder bed fusion involves depositing at least one layer of powder then partially or completely fusing at least some of the particles of the powder, preferably all of the particles in the layer deposited by a selective application of energy using a laser beam.

The median diameter of the particles of the powder $D_{50}$ can be between 1 μm and 100 μm, preferably between 1 μm and 80 μm, for example between 5 μm and 45 μm. The size of the parietal pores can therefore be easily controlled.

The particles can comprise one of the following metals: aluminium, nickel, cobalt, iron, copper, palladium, titanium, tungsten, silver, platinum and alloys thereof, notably stainless steel or a shape-memory alloy, notably comprising more than 95.0% of the mass thereof, notably more than 99.0% of the mass thereof, or notably more than 99.9% of the mass thereof.

The particles can comprise one of the following polymers: polyamides, polystyrenes, thermoplastic elastomers, and polyaryletherketones and mixtures thereof, preferably polyamides, in particular a nylon such as nylon PA12, nylon PA11 or nylon PEBA, notably comprising more than 80% of the mass thereof, or more than 90% of the mass thereof.

The powder can be monodisperse.

The additive manufacturing technique can involve repeating, notably more than 10 times, or more than 1000 times, a cycle comprising the deposition of a powder layer of thickness of between 6 μm and 200 μm, preferably between 10 μm and 120 μm, and irradiating at least a portion of the layer using the light beam, preferably a laser beam. In a variant, the cycle for example involves depositing a layer of powder that is between 1 μm and 80 μm thick.

The additive manufacturing step can include depositing an initial layer of powder on a manufacturing plate, in particular a plate heated to a temperature of between 20° C. and 250° C., notably between 190° C. and 210° C.

The fusion of powder particles can be controlled using a pre-prepared computer database. At each step, the computer database controls the spatial movement of the light beam in relation to the deposited powder by executing a computer program using a processor. The computer database can control:

the geometry of the porous structure, and notably of the walls delimiting the cellular pores, by controlling the trajectory of the light beam, and the porosity of the walls, by selecting the appropriate operating parameters for the additive manufacturing technique, and notably by controlling the energy density of the light beam.

The selective fusion of the powder is controlled by selecting the main control parameters of the additive manufacturing technique, notably including the movement speed of the light beam (V), the power (P) of the light beam, shift value between the displacement vectors of the light beam (HD), the gap between two lasered beads (HD), and the rotation of the beads from one layer to another.

Preferably, at least one of the control parameters for the additive manufacturing is selected to partially coalesce the particles to bind said particles to one another. Partial coalescence enables some of the porosity of the powder to be preserved, and enables porous walls to be formed. Using the additive manufacturing technique is therefore different from the prior art, in which the fullest possible fusion of the particles is usually sought to form a dense metal wall.

The parietal porosity can be adjusted by adapting the energy density of the light beam. Beneath a threshold energy density, the parietal porosity increases as the energy density is reduced. The "threshold energy density" is the energy density above which a porous structure with dense walls is obtained. A "porous structure with dense walls" has a parietal porosity below 0.5%.

The energy density E, expressed as J/mm³, is determined using the following mathematical formula:

$$E = \frac{P}{V \cdot HD \cdot e} \qquad \text{[Math 1]}$$

in which:

P is the power of the light beam, notably a laser beam, expressed in W,

V is the movement speed of the light beam, notably a laser beam, expressed in mm/s, HD is the shift value between the displacement vectors of the light beam, notably between two lasered beads, expressed in mm, and e is the layer thickness, expressed in mm.

Preferably, the ratio of the energy density of the light beam to the threshold energy density is between 0.3 and 0.9.

The movement speed of the beam is the relative speed of the point formed by the light beam on the powder layer, relative to said layer. For a power P of the light beam, with a constant shift value HD and a constant layer thickness e, and above a threshold movement speed, the parietal porosity of the porous cellular structure increases as the movement speed increases. The "threshold movement speed" is the movement speed beneath witch a porous structure with dense walls is obtained, for a constant power P of the light beam, a constant shift value HD and a constant layer thickness e. The movement speed of the light beam can be less than 6000 mm/s. A high movement speed can be used, and the manufacture of the part according to the invention is also quicker than the manufacture of cellular metal parts with dense walls obtained using an additive manufacturing method according to the prior art.

For example, for a light beam power of 275 W, a layer thickness of 50 μm, a shift value between the displacement vectors of the light beam of between 80 and 120 μm and a stainless steel powder having a median diameter of 36 μm, the movement speed of the light beam is between 1500 and 6000 mm/s.

The trajectory of the light beam follows the displacement vectors shifted spatially in pairs according to a shift value HD.

The person skilled in the art is able to adjust the parietal porosity within the porous structure for a predetermined power of the light beam, a predetermined movement speed of the light beam and a predetermined layer thickness by adapting said shift value. For example, under these conditions, the parietal porosity increases as the shift value increases.

The thickness of the deposited powder layer also enables the parietal porosity to be adjusted. For a predetermined power of the light beam, a predetermined shift value and a predetermined movement speed, the parietal porosity increases as the thickness of the layer increases.

In one embodiment, the method can include the following steps before production of the porous structure:

(i) manufacturing at least one test structure with different respective light beam powers in order to determine the threshold energy density $E_{threshold}$, the movement speed $V_0$ of the light beam, the shift value $HD_0$ of the light beam, and the thickness of the layer $e_0$ being predetermined and kept constant during manufacture of said at least one test structure, (ii) selecting at least one of the following parameters: movement speed of the light beam, shift value of the light beam, and thickness of the layer so that the energy density of the light beam during the subsequent manufacturing step is less than $E_{threshold}$.

The parameters described above can be adjusted as a function of the composition of the powder used.

BRIEF DESCRIPTION OF THE DRAWINGS

The invention can be better understood from the detailed description of the example given below and the attached drawing, in which:

FIG. 1 is a photograph of an example part according to the invention, as well as an optical microscopy photograph of a wall of the part, FIG. 2 is a schematic view of different examples of the basic pattern repeated to form a porous structure according to the invention, and FIG. 3 is a schematic view of an example embodiment of an additive manufacturing method on a powder bed using a laser beam (A) in a configuration without overlapping (B) and with overlapping (C).

DETAILED DESCRIPTION

An example part 10 according to the invention is shown in FIG. 1.

The part is a cube of dimensions 50×50×50 mm³. The part has a porous structure 15 comprising open cellular pores 20 and metal walls 30, each of which delimits one or more cellular pores and forms a partition between adjacent cellular pores.

The cellular pores 20 have a substantially spherical shape with a diameter of 5.6×5.6 mm². The pores are arranged periodically along three orthogonal axes.

The walls 30 are hollow, i.e. there are cavities traversing the entire thickness of the walls, providing a fluid link with adjacent cellular pores.

As shown in the enlarged photograph of a wall 30, a wall 30 contains parietal pores 31 that are delimited by dense metal zones 32.

The part therefore has a cell porosity determined by the cellular pores and a parietal porosity determined by the parietal pores.

FIG. 2 shows different examples of basic patterns 50 that form a porous structure by periodic repetition. Naturally, basic patterns other than those shown can be used to form a porous structure.

The basic patterns are for example a lattice, which can be based on a cube, octahedron, dodecahedron, octagonal gyrobicupola, cuboctahedron, truncated octahedron, great icosahedron or icosahedron.

A cellular pore can be delimited by a basic pattern, for example a cube 51 or an octahedron 52. Such a cellular pore 20 is then delimited by a wall 30 with several faces, each face having a through-cavity 53. The wall of such a cellular pore then has a polyhedral lattice form.

In a variant, a cellular pore can be delimited by repeating the basic pattern in at least one direction, as is for example the case of the star-shaped basic pattern shown in FIG. 2.

FIG. 3A shows the trajectory of a laser beam 100 during manufacture of a porous structure by laser additive manufacturing on a powder bed. The spot of the laser beam is moved along the displacement vectors spaced apart by a shift value HD on a powder bed 110 of thickness e to be fused, deposited on previously deposited layers and bound together 120 by the laser beam. As shown in FIGS. 3B and 3C, the zones impacted, and therefore partially fused, by the laser beam extend through the entire thickness of the layer to be fused, as well as through a portion of the lower layer on which the layer being fused rests. The zones impacted by the laser beam during movement thereof can be non-overlapping (FIG. 3B) or partially overlapping (FIG. 3C). A shift value HD can therefore prevent partial overlapping of the impacted zones and facilitate the formation of parietal porosity. Furthermore, a high movement speed of the laser spot causes lower local heating of the zone impacted by the laser beam, which facilitates the formation of parietal porosity.

EXAMPLES

Example 1

The part illustrated in FIG. 1 was manufactured as follows:

A powder of particles of 316L stainless steel with a median diameter D50 of 36 μm was used in a LPBF additive manufacturing machine sold by SLM Solutions. The machine is fitted with a laser source emitting a wavelength of 1040 nm.

The part was manufactured with the additive manufacturing machine on a manufacturing plate made of 316L stainless steel heated to a temperature of 200° C. with the following parameters:

layer thickness: 30 μm,
    laser power: 225 W,
    movement speed of the laser beam: 4771 mm/s,
    shift value: 100 μm,
    energy density of the laser beam: 15.71 J/mm³.

These specific operating parameters result in a porous structure with a specific parietal porosity.

Example 2

A 316L stainless steel powder with a median diameter D50 of 36 μm was used in an LPBF machine sold by SLM Solutions. The machine is fitted with a laser source emitting a wavelength of 1040 nm.

The part was manufactured with the additive manufacturing machine on a manufacturing plate made of 316L stainless steel heated to a temperature of 200° C. with the following parameters:

layer thickness: 50 μm,
    laser power: 275 W,
    movement speed of the laser beam: 3501 mm/s,
    shift value: 120 μm.

The energy density of the laser beam is less than the threshold energy density. The porous structure has a cell porosity of 85% and the metal walls thereof have a parietal porosity of 35.7%, measured by using optical microscopy and image processing. The total porosity of the part is therefore 94.6%.

Naturally, the invention is not limited to the example embodiments of the part and the example implementations of the method described by way of non-limiting example.

For example, the part according to the invention is a heat exchanger, a filtering member or a structural part. Such a part can therefore be used in the healthcare, mining or construction sectors.

The invention claimed is:

1. A part, comprising:
    a porous structure comprising cellular pores and formed at least in part by the periodic repetition of a basic pattern, each cellular pore being delimited by a wall, made of a metal or a polymer, having a parietal porosity in a range of from 5 to 80% and comprising parietal pores with a mean size less than the mean size of the cellular pores,
    wherein the porous structure is obtained by shaping a powder using an additive manufacturing technique comprising laser powder bed fusion or selective laser sintering,
    wherein a mean size of the parietal pores is less than 500 μm, in which at least 85% of the parietal pores are smaller than 200 μm, and in which more than 50% of the parietal pores are smaller than 50 μm, and
    wherein the parietal porosity does not vary by more than 20% between two different zones of volume equal to three times the cube of the thickness of one of the walls.

2. The part of claim 1, wherein the mean size of the cellular pores is at least 20 times greater than the mean size of the parietal pores.

3. The part of claim 1, wherein the porous structure is made of a metal.

4. The part of claim 1, wherein the porous structure comprises: aluminum, nickel, cobalt, iron, copper, palladium, titanium, tungsten, silver, and/or platinum.

5. The part of claim 1, wherein the cell porosity is greater than 70% and/or less than 97%.

6. A method for manufacturing the part of claim 1, the method comprising:
    producing the porous structure by shaping a powder using an additive manufacturing technique comprising laser powder bed fusion or selective laser sintering.

7. The method of claim 6, wherein the additive manufacturing technique is a powder-bed additive manufacturing technique.

8. The method of claim 7,
    wherein the additive manufacturing technique comprises the partial or complete fusion of powder particles using a light beam.

9. The method of claim 8, wherein the additive manufacturing technique comprises the partial or complete fusion of powder particles using a light beam.

10. The method of claim 9, wherein the ratio of the energy density of the light beam to the threshold energy density is in a range of from 0.3 to 0.9, the threshold energy density being the energy density above which a porous structure with dense walls is obtained.

11. The method of claim 6, wherein the median diameter of the particles of the powder is in a range of from 1 to 100 μm.

12. The method of claim 9, wherein the additive manufacturing technique involves repeating a cycle comprising the deposition of a powder layer of thickness (e) of in a range of from 6 to 200 μm, and irradiating at least a portion of the layer using the light beam.

13. The method of claim 9, comprising, before production of the porous structure:

(i) manufacturing at least one test structure with different respective light beam powers in order to determine the threshold energy density $E_{threshold}$ above which the porous structure with dense walls is obtained, the movement speed $V_0$ of the light beam, the shift value $HD_0$ of the light beam, and the thickness of the layer $e_0$ being predetermined and kept constant during manufacture of said at least one test structure, (ii) selecting at least one of: movement speed of the light beam, shift value of the light beam, and thickness of the layer, so that the energy density of the light beam during the subsequent manufacturing step is less than $E_{threshold}$.

14. A shock absorbing device formed at least partially by the part of claim 1.

15. A device, comprising:

the part of claim 1, wherein the device is a vehicle, a porous tank, a shim, or an acoustic damper.

16. The part of claim 1, wherein the additive manufacturing technique comprising the laser powder bed fusion.

* * * * *